United States Patent
Mizuno et al.

[11] Patent Number: 5,443,803
[45] Date of Patent: Aug. 22, 1995

[54] CATALYST FOR PURIFYING EXHAUST GAS

[75] Inventors: Tatsuji Mizuno, Toyota; Shinichi Takeshima, Susono; Kazuhiko Sekizawa; Senshi Kasahara, both of Shinnanyo, all of Japan

[73] Assignees: Toyota Jidosha Kabushiki Kaisha, Toyota; Tosoh Corporation, Shinnanyo, both of Japan

[21] Appl. No.: 925,669

[22] Filed: Aug. 7, 1992

[30] Foreign Application Priority Data

Aug. 7, 1991 [JP] Japan .................. 3-198018

[51] Int. Cl.$^6$ ............................. B01D 53/94
[52] U.S. Cl. ................. 423/213.2; 423/239.2
[58] Field of Search .......... 423/212, 239.2, 213.2

[56] References Cited
U.S. PATENT DOCUMENTS 4,052,337 10/1977 Nishikawa et al. ............ 423/239
5,051,244 9/1991 Dunne et al. .................. 423/212
5,270,024 12/1993 Kasahara et al. ............. 423/239.2

FOREIGN PATENT DOCUMENTS 0286967 10/1988 European Pat. Off. .
0313434 4/1989 European Pat. Off. .
0737665 6/1990 European Pat. Off. .
0434063 6/1991 European Pat. Off. .
60-125250 7/1985 Japan .
3-196842 8/1991 Japan .

*Primary Examiner*—Michael Lewis
*Assistant Examiner*—Peter Di Mauro
*Attorney, Agent, or Firm*—Oblon, Spivak, McClelland, Maier & Neustadt

[57] ABSTRACT

A catalyst for purifying an exhaust gas comprising a zeolite catalyst ion exchanged with cobalt and at least one alkaline earth metal and a zeolite catalyst ion-exchanged with copper, provided on an inlet side of an exhaust gas stream and an outlet side of the exhaust gas respectively, or randomly present in a mixed state.

10 Claims, 1 Drawing Sheet

CATALYST FOR PURIFYING EXHAUST GAS

BACKGROUND OF THE INVENTION

1. Field of the Invention

The present invention relates to a catalyst for purifying an exhaust gas which can remove nitrogen oxides contained in an exhaust gas discharged, for example, from internal combustion engines of automobiles, chemical plants such as plants for producing nitric acid, etc. More specifically, the present invention relates to a catalyst for purifying an exhaust gas which can effectively remove NOx in an oxygen rich atmosphere, such as an exhaust gas from a lean burn engine, within a broad temperature region. The term "an oxygen rich atmosphere" used herein means an atmosphere having an oxygen content larger than that of a stoichiometrical air-fuel ratio.

2. Description of the Related Art

It is known that nitrogen oxides (NOx), carbon monoxide (CO) and hydrocarbons (HC), which are toxic substances contained in an exhaust gas discharged from internal combustion engines, are removed by, for example, using a three-way catalyst comprising platinum, rhodium, palladium, etc., supported on a carrier. In the case of an exhaust gas discharged from diesel engines, however, the three-way catalyst is not effective for removing nitrogen oxides because the exhaust gas contains a large amount of oxygen.

In recently developed gasoline engines, lean burn has become necessary for the purpose of lowering the fuel consumption and reducing the amount of exhausted carbon dioxide gas. Since, however, an exhaust gas from this lean burn gasoline engine comprises an oxygen rich atmosphere, the above-mentioned three-way catalyst was not effective.

In view of these circumstances, various proposals have been made on catalysts for purifying an exhaust gas from automobiles wherein the oxidation of carbon monoxide (CO) and hydrocarbons (HC) and the reduction of nitrogen oxides (NOx) are simultaneously effected. A copper-containing-zeolite catalyst comprising a zeolite ion-exchanged with copper is known in the art as a catalyst of this type for catalytic decomposition of NOx (see Japanese Unexamined Patent Publication (Kokai) No. 60-125250). Although this catalyst can remove NOx with high efficiency in an oxygen rich atmosphere, it has the problem that the region in which the catalyst exhibits catalytic activity is as narrow as 350° to 400° C.

A zeolite catalyst ion-exchanged with cobalt and an alkaline earth metal has been proposed as a catalyst for simultaneously removing nitrogen oxides, carbon monoxide and hydrocarbons from an oxygen rich exhaust gas discharged from internal combustion engines of automobiles, the catalyst of which is less liable to suffer heat deterioration and has superior durability and high catalytic activity (see Japanese Unexamined Patent Publication (Kokai) No. 3-196842). This catalyst also has the problem that the region in which the catalyst exhibits catalytic activity is as narrow as 400° to 450° C. According to studies conducted by the present inventors, the problem concerning the region in which the catalyst exhibits catalytic activity is inherent in the supported metal components, that is, cobalt, alkaline earth metal and copper.

SUMMARY OF THE INVENTION

Accordingly, the objects of the present invention are to solve the above-mentioned problems of conventional catalysts for purifying an exhaust gas and to develop a catalyst for purifying an exhaust gas which can efficiently remove nitrogen oxides, carbon monoxide and hydrocarbons from an oxygen-rich atmosphere containing nitrogen oxides, carbon monoxide and hydrocarbons within a broad temperature region.

Other objects and advantages of the present invention will be apparent from the following description.

In accordance with the present invention, there is provided a catalyst for purifying an exhaust gas comprising (i) a first zeolite catalyst ion-exchanged with cobalt and at least one alkaline earth metal, provided on an inlet side of an exhaust gas stream, and (ii) a second zeolite catalyst ion-exchanged with copper, provided on an outlet side of the exhaust gas stream.

In accordance with the present invention, there is also provided a catalyst for purifying an exhaust gas comprising (i) a zeolite catalyst ion-exchanged with cobalt and at least one alkaline earth metal and (ii) a zeolite catalyst ion-exchanged with copper in a mixed state.

BRIEF DESCRIPTION OF THE DRAWING

The present invention will be better understood from the description set forth below with reference to the accompanying drawing of FIG. 1, which is a diagram showing the state of a combination of catalysts in Example 4.

DESCRIPTION OF THE PREFERRED EMBODIMENTS

Figure 1:
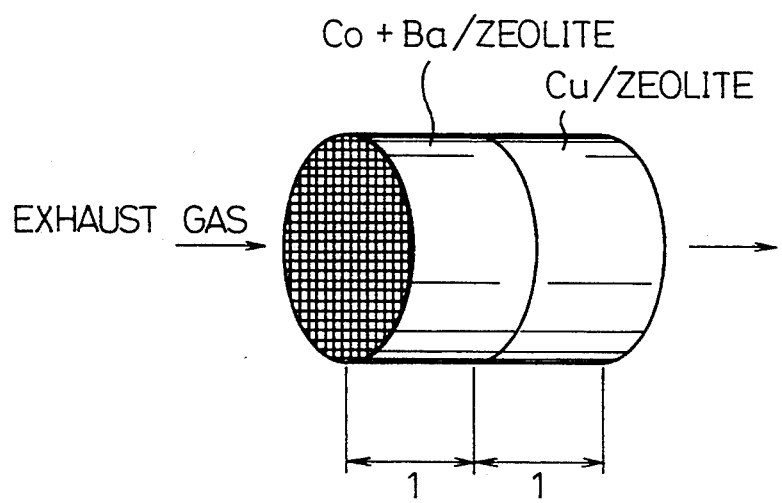

In the first catalyst for purifying an exhaust gas according to the present invention, a zeolite catalyst comprising a zeolite and, incorporated therein, cobalt and an alkaline earth metal (i.e., the first catalyst component) and a zeolite catalyst ion-exchanged with copper (second catalyst component) are provided in combination, on an inlet side of an exhaust gas stream and an outlet side of the exhaust gas stream respectively.

The second catalyst for purifying an exhaust gas according to the present invention comprises the first catalyst component and the second catalyst component in a mixed state.

As is well known in the art, in the zeolite used as a carrier in the first catalyst component and the second catalyst component of the catalyst for purifying an exhaust gas according to the present invention, three-dimensional networks comprising $SiO_4$ and $AlO_4$ tetrahedron are formed. Individual tetrahedron are linked to a crosslink of oxygen through the corner of the tetrahedron to form a network structure having interconnected micro pores, and an exchangeable cation is introduced into an ion exchange site having a negative charge of the lattice. The zeolite generally has the following composition:

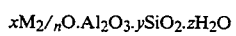

$xM_{2/n}O \cdot Al_2O_3 \cdot ySiO_2 \cdot zH_2O$ wherein n is a valence of the cation (M), x is 0.8 to 2, y is at least 2 and z is at least 0 (zero).

In the zeolite used in the present invention, the $SiO_2/Al_2O_3$ molar ratio is preferably at least 10, and more preferably 10 to 200. When the molar ratio is less than 10, the heat resistance and durability of the zeolite per se are so low that there is a possibility that the heat resistance and durability of the catalyst are unsatisfactory. The zeolite usable as the catalyst of the present invention may be any of natural zeolites and synthetic zeolites. There is no particular limitation on the method of producing the zeolite. Representative examples of the zeolite used in the present invention include ferrierite, Y, ZSM-5, ZSM-11, ZSM-12, ZSM-20 and mordenite. These zeolites, as such, may be used as the catalyst of the present invention. Alternatively, they may be used as the catalyst after treatment with an ammonium salt, a mineral acid or the like for an ion exchange to form an $NH_4^+$ or $H^+$ type zeolite.

The zeolite usable in the first catalyst component of the present invention should contain cobalt and at least one alkaline earth metal (for example, Ba, Ca, Mg, Sr, Be, Ra, etc.). Cobalt and an alkaline earth metal can be incorporated into the zeolite by any known method, and are generally incorporated by an ion exchange method, an impregnation method, etc. The ion exchange method is especially preferred.

The salt usable in the ion exchange of the alkaline earth metal is not limited so far as it is soluble in water, and is preferably nitrate and chloride having a high solubility. The ion exchange is conducted by a general ion exchange method such as a method wherein a salt of an alkaline earth metal is put in a slurry of the zeolite and a method wherein the zeolite is put into an aqueous solution of an alkaline earth metal salt. The solution temperature is preferably 20° to 100° C., and most preferably 40° to 90° C. The concentration of the alkaline earth metal salt in the aqueous solution is 0.01 to 5 mol/liter, and preferably 0.1 to 2 mol/liter. There is no particular limitation on the solid-liquid ratio of the zeolite to the aqueous solution so far as stirring can be sufficiently conducted. The solid content of the slurry is preferably 5 to 50% by weight.

On the other hand, in the ion exchange of cobalt, any cobalt salts may be used so far as they are soluble in water. The cobalt salt is preferably a divalent acetate. In the ion exchange of cobalt, there is no particular limitation on the number of ion exchanges so far as the degree of exchange is high. When the degree of ion exchange is low, it is possible to repeat the ion exchange two or more times. The number of ion exchanges is not limited, and the repetition of two to five times is sufficient.

The ion exchange can be conducted by the same method as that mentioned above in connection with the ion exchange of the alkaline earth metal. The concentration of the cobalt acetate in the aqueous solution is preferably 0.01 to 1 mol/liter, and more preferably 0.1 to 1 mol/liter. When the concentration is too low, it is necessary to use a large amount of solution, so that handleability is lowered. On the other hand, when the concentration is too high, no improvement in the degree of ion exchange corresponding to the amount of the reagent can be attained.

Although there is no particular limitation on the sequence of the incorporation of the alkaline earth metal and cobalt, when the incorporation is conducted by the ion exchange method, it is preferable to conduct the incorporation of the alkaline earth metal and the incorporation of cobalt in that order. With respect to the contents of the alkaline earth metal and cobalt, the alkaline earth metal and cobalt are preferably 0.1 to 1 time (more preferably 0.3 to 0.8 times) and 0.1 to 1.7 times (more preferably 0.5 to 1.5 times) respectively in terms of molar ratio to alumina in the zeolite. The total content of the alkaline earth metal and cobalt is preferably 1.0 to 2.5 times. When the content of the alkaline earth metal is too low, there is a possibility that no satisfactory improvement in the durability and catalytic activity can be attained. On the other hand, when the content is too high, it is difficult to attain an effect corresponding to the amount of addition. When the cobalt content is too low, there is a possibility that the product cannot be used as a catalyst. On the other hand, when the content is too high, it is difficult to attain a durability and activity corresponding to the amount of addition. It is also possible to use the alkaline earth metal and cobalt after supporting them on the zeolite by, for example, evaporation to dryness. The evaporation to dryness may be conducted by conventional methods including a method which comprises putting zeolite into an aqueous solution containing an alkaline earth metal or cobalt and evaporating the water solvent in a dryer or the like. There is no particular limitation on the concentration of the alkaline earth metal and cobalt salt in the aqueous solution so far as the alkaline earth metal and cobalt can be homogeneously deposited on the zeolite. The concentration is usually 0.01 to 1 mol/liter. The ion-exchanged zeolite is subjected to solid-liquid separation, washing and drying before use as a catalyst. If necessary, it can be used as a catalyst after calcination, although there is no particular limitation on the calcination condition. The calcination is generally conducted at 400° to 600° C. for 2 to 5 hours.

In the second catalyst component of the present invention, copper is incorporated in a zeolite by an ion exchange method. Although there is no particular limitation on the amount of copper, the amount is preferably 0.1 to 2.0 times, and more preferably 0.3 to 1.5 times in terms of molar ratio to alumina in the zeolite. Copper can be incorporated by any conventional methods such as, for example, an ion exchange method or an impregnation method. For example, $Na^+$, $H^+$, or other ions introduced into the ions exchange site having a negative charge of the lattice of the zeolite can be exchanged with a copper ion. The copper ion is present in the form of $Cu^+$, $Cu^{2+}$, $CuOH^+$, etc. The zeolite ion-exchanged with copper ion is subjected to solid-liquid separation, washing, and drying before use as a catalyst. If necessary, it can be used as a catalyst after calcination. Although there is no particular limitation on the calcination condition, the calcination is generally conducted at 400° to 600° C. for 2 to 5 hours.

In the first embodiment of the catalyst for purifying an exhaust gas according to the present invention, the first catalyst component and the second catalyst component each supported on a zeolite may be separately granulated or molded into a granule or a pellet or supported on a base material having a honeycomb or any other form and then provided as a monolith catalyst in combination, respectively, on an inlet side (first catalyst component) of an exhaust gas and an outlet side (second catalyst component) of the exhaust gas.

In the second embodiment of the catalyst for purifying an exhaust gas according to the present invention, a zeolite catalyst ion-exchanged with cobalt and an alkaline earth metal and a zeolite catalyst ion-exchanged with copper are randomly supported on a suitable base material, such as cordielite, alumina, silica-alumina or spodumene, and these catalyst components are allowed to exist in the form of a mixture.

The purification of an exhaust gas can be conducted by using a catalyst for purifying an exhaust gas according to the present invention by a method wherein the above-mentioned catalyst is brought into contact with an exhaust gas containing NOx, CO and HC, particularly an oxygen rich exhaust gas (i.e., an exhaust gas having a high air-fuel ratio (i.e., the so-called "lean region") discharged from internal combustion engines of automobiles, etc.)

In the purification method according to the present invention, although there is no particular limitation on the space velocity (SV) at which an exhaust gas is introduced into the catalyst layer, for example, the space velocity is preferably in the range of from 1000 to 500,000/hr, from the viewpoint of maintaining the activity.

According to the above-mentioned method, the performance of the zeolite catalyst ion-exchanged with Cu ion and the performance of the zeolite catalyst ion-exchanged with Co and an alkaline earth metal are simultaneously exerted, and the interaction between the two zeolite catalysts becomes strong. For example, in the case of sole use of a zeolite ion-exchanged with Co and an alkaline earth metal, some HC components are not consumed in the HC oxidation. Since the zeolite catalyst ion-exchanged with Cu ion has no HC selectivity (that is, the zeolite containing Cu can consume any HC), the HC in the exhaust gas can be effectively utilized through a combination or mixing of the two types of zeolite catalysts. This broadens the temperature region in which a reductive cleavage of NOx occurs and the catalytic activity can be improved (that is, it enables NOx to be removed with high conversion within a broad temperature region from a low temperature to a high temperature). Further, the temperature region can be controlled by varying the mixing ratio or the distribution ratio of the catalyst provided on the inlet side of the exhaust gas stream to the catalyst provided on the outlet side of the exhaust gas stream.

EXAMPLES

The present invention will now be described in more detail with reference to, but not limited to, the following Examples.

Example 1

A 20 g amount of an ammonium-type zeolite ZSM-5 having a $SiO_2/Al_2O_3$ molar ratio of 38.5 was charged into 180 g of a 1.09 mol/liter aqueous solution of barium chloride, and the mixture was stirred at 80° C. for 16 hours. After the solid-liquid separation, the solid was sufficiently washed with water and charged into 180 g of a 0.23 mol/liter cobalt acetate (II) tetrahydrate, and the mixture was stirred at 80° C. for 16 hours. After the solid-liquid separation of the slurry, the zeolite cake was charged into a fresh aqueous solution having the above-mentioned composition, and the above-mentioned procedure was repeated. After the solid-liquid separation, the solid was washed with water and dried at 110° C. for 10 hours. The resultant catalyst 1-1 was chemically analyzed to determine the barium and cobalt contents. As a result, it was found that barium and cobalt (in terms of a divalent cobalt) were contained in respective amounts of 0.51 time and 0.57 time in terms of molar ratio to $Al_2O_3$ in the zeolite.

Separately, 20 g of an ammonium type zeolite having a $SiO_2/Al_2O_3$ molar ratio of 38.9 was charged into 150 cc of a 0.1 mol/liter copper acetate solution, and ammonia was added thereto to regulate the pH value to 10.5. Then, the slurry was stirred at room temperature for 24 hours. After the solid-liquid separation, the solid was sufficiently washed with water and dried at 105° C. for 16 hours. The resultant catalyst 1-2 was chemically analyzed. As a result, it was found that copper (in terms of divalent copper) was contained in an amount of 1.0 time in terms of molar ratio to $Al_2O_3$.

The catalysts 1-1 and 1-2 prepared above were mixed with each other in a weight ratio of 1:1, and the mixture was used as a catalyst for a test. A mixed catalyst comprising the catalysts 1-1 and 1-2, distilled water and silica sol (solid content: 40%) were mixed in a weight ratio of 9:4:5, and the mixture was stirred at room temperature for one hour to provide a slurry.

Then, a commercially available cordierite honeycomb base material (dimension: 30 mm$\phi \times$50 mmL) was immersed in the above-mentioned slurry and then taken out, and the excess slurry was blown away. The coated material was subjected to air-blown drying and calcined at a temperature of 500° C. for 3 hours to provide a honeycomb catalyst comprising the base material and, randomly supported thereon, the catalyst 1-1 ion-exchanged with Co and Ba and the zeolite catalyst 1-2 ion-exchanged with Cu (i.e., Catalyst of Example 1).

Example 2

The catalysts 1-1 and 1-2 prepared in Example 1 were mixed with each other in a weight ratio of 2:1, and the procedure of Example 1 was repeated to provide a honeycomb catalyst (i.e., Catalyst of Example 2).

Example 3

The catalysts 1-1 and 1-2 prepared in Example 1 were mixed with each other in a weight ratio of 1:2, and the procedure of Example 1 was repeated to provide a honeycomb catalyst (i.e., Catalyst of Example 3).

Example 4

A catalyst 4-1 containing Ba as the alkaline earth metal was prepared in the same manner as that used in Example 1 for preparing the catalyst 1-1. This catalyst, distilled water and silica sol having a solid content of 40% were mixed with each other in a weight ratio of 9:4:5, and the mixture was stirred at room temperature for one hour to provide a slurry A.

The catalyst 4-2 prepared in the same method as that used in Example 1 for preparing the catalyst 1-2, distilled water and silica sol having a solid content of 40% were mixed with each other in a weight ratio of 9:4:5, and the mixture was stirred at room temperature for one hour to provide a slurry B.

Two types of honeycomb catalysts A and B were prepared by using the slurries A and B in the same manner as that used in Example 1 for preparing a honeycomb catalyst. The catalyst A containing Co and Ba was used in combination with the catalyst B containing Cu in a volume ratio of 1:1 (inclusive of the honeycomb base material) as shown in FIG. 1 to provide a single honeycomb catalyst (i.e., Catalyst of Example 4).

Comparative Example 1

The procedure of Example 1 was repeated to prepare a honeycomb catalyst from a catalyst prepared in the same manner as that used in Example 1 for preparing the catalyst 1-2 (i.e., Catalyst of Comparative Example 1).

Comparative Example 2

The procedure of Example 1 was repeated to prepare a honeycomb catalyst from a catalyst prepared in the same manner as that used in Example 1 for preparing the catalyst 1-1 (i.e., Catalyst of Comparative Example 2).

Evaluation Test of Catalyst Performance

A conventional fixed bed flow reactor was used, and a model exhaust gas corresponding to A/F=22 (HC: 1170 ppm, CO: 1200 ppm, NOx: 530 ppm, $O_2$: 7.5%, $H_2O$: 10%) was passed through the reactor at a space velocity (SV) of 85,700/hr to determine conversions at respective temperatures. The results are provided in Tables 1 and 2.

TABLE 1

Results of Evaluation of Catalyst Activity (Efficiency: %)

| Temp. | Ex. 1 | | | Comp. Ex. 1 | | | Comp. Ex. 2 | | |
|---|---|---|---|---|---|---|---|---|---|
| (°C.) | HC | CO | NOx | HC | CO | NOx | HC | CO | NOx |
| 300 | 8 | 8 | 11 | 25 | 4 | 10 | 2 | 10 | 3 |
| 350 | 32 | 3 | 38 | 75 | 28 | 38 | 8 | 13 | 8 |
| 400 | 86 | 8 | 51 | 86 | 84 | 37 | 37 | 8 | 27 |
| 450 | 97 | 88 | 50 | 95 | 89 | 32 | 79 | 6 | 47 |
| 500 | 99 | 93 | 35 | 98 | 92 | 21 | 94 | 36 | 36 |
| 550 | 99 | 95 | 20 | 99 | 94 | 10 | 98 | 80 | 17 |
| 600 | 99 | 96 | 7 | 99 | 94 | 4 | 99 | 91 | 6 |

TABLE 2

Results of Evaluation of Catalyst Activity (Efficiency: %)

| Temp. | Ex. 2 | | | Ex. 3 | | | Ex. 4 | | |
|---|---|---|---|---|---|---|---|---|---|
| (°C.) | HC | CO | NOx | HC | CO | NOx | HC | CO | NOx |
| 300 | 6 | 8 | 9 | 10 | 4 | 8 | 22 | 25 | 9 |
| 350 | 25 | 13 | 37 | 51 | 25 | 38 | 65 | 28 | 31 |
| 400 | 80 | 12 | 41 | 85 | 80 | 37 | 93 | 77 | 41 |
| 450 | 87 | 10 | 37 | 93 | 85 | 36 | 97 | 90 | 40 |
| 500 | 95 | 38 | 33 | 98 | 90 | 25 | 98 | 93 | 28 |
| 550 | 99 | 82 | 16 | 99 | 93 | 14 | 98 | 95 | 16 |
| 600 | 99 | 93 | 6 | 99 | 94 | 5 | 99 | 97 | 6 |

As is apparent from the results shown in Tables 1 and 2, when a zeolite catalyst ion-exchanged with cobalt and an alkaline earth metal are used in combination with a zeolite catalyst ion-exchanged with copper in the above-mentioned manner according to the present invention, the temperature region in which the catalyst exhibits good purification activity can be broadened compared with the case when each catalyst is solely used, which thereby renders the catalyst of the present invention practically useful.

We claim:

1. A method for purifying an exhaust gas containing nitrogen oxides, carbon monoxide and hydrocarbons in an oxygen rich atmosphere comprising:

i) bringing said exhaust gas into contact with two different catalysts, said catalysts comprising (i) a first zeolite catalyst ion-exchanged with cobalt and at least one alkaline earth metal, the amount of cobalt is 0.1 to 1.7 times, in terms of molar ratio to alumina in said first zeolite catalyst and the amount of the alkaline earth metal is 0.1 to 1 times, in terms of molar ratio to alumina in said first zeolite catalyst, provided on an inlet side of an exhaust gas stream and (ii) a second zeolite catalyst ion-exchanged with copper, the amount of copper is 0.1 to 2 times, in terms of molar ratio to alumina in said second zeolite catalyst, provided on an outlet side of said exhaust gas stream; and ii) wherein some unconsumed hydrocarbon components are passed from the contact with said first catalyst into contact with said second catalyst and consumed prior to discharging said exhaust gas from said outlet side of said exhaust gas stream.

2. A method for purifying an exhaust gas containing nitrogen oxides, carbon monoxide and hydrocarbons in an oxygen rich atmosphere comprising:

(i) bringing said exhaust gas into contact with two different catalysts, said catalysts comprising (i) a first zeolite catalyst ion-exchanged with cobalt and at least one alkaline earth metal, the amount of cobalt is 0.1 to 1.7 times, in terms of molar ratio to alumina in said first zeolite catalyst and the amount of the alkaline earth metal is 0.1 to 1 times, in terms of molar ratio to alumina in said first zeolite catalyst, and (ii) a second zeolite catalyst ion-exchanged with copper, the amount of copper is 0.1 to 2 times, in terms of molar ratio to alumina in said second zeolite catalyst, wherein said first and second zeolite catalysts are randomly supported on a base material in the form of a mixture; and ii) wherein some unconsumed hydrocarbon components are passed from the contact with said first catalyst into contact with said second catalyst and consumed prior to discharging said exhaust gas.

3. The method of claim 1, wherein said alkaline earth metal is selected from the group consisting of Ba, Ca, Mg, Sr, Be and Ra.

4. The method claim 2, wherein said alkaline earth metal is selected from the group consisting of Ba, Ca, Mg, Sr, Be and Ra.

5. The method of claim 1, wherein said exhaust gas is at a temperature of from 350°-550° C.

6. The method of claim 1, wherein said exhaust gas is at a temperature of from 350°-500° C.

7. The method of claim 1, wherein said exhaust gas is at a temperature of from 400°-500° C.

8. The method of claim 2, wherein said exhaust gas is at a temperature of from 350°-550° C.

9. The method of claim 2, wherein said exhaust gas is at a temperature of from 350°-500° C.

10. The method of claim 2, wherein said exhaust gas is at a temperature of from 400°-500° C.

* * * * *